United States Patent [19]
Okagaki et al.

[11] Patent Number: 5,483,121
[45] Date of Patent: Jan. 9, 1996

[54] HOLLOW CATHODE DISCHARGE TUBE

[75] Inventors: Hiroshi Okagaki, Mito; Takayuki Kameya, Ohmiya; Hiroshi Ishizaki, Urawa; Kazuya Abe, Sashima, all of Japan

[73] Assignee: Koto Electric Co., Ltd., Urawa, Japan

[21] Appl. No.: 51,208

[22] Filed: Apr. 22, 1993

[30] Foreign Application Priority Data

Apr. 24, 1992 [JP] Japan ................. 4-106503

[51] Int. Cl.⁶ ........................... H01J 61/09
[52] U.S. Cl. .............. 313/618; 313/621; 313/632; 313/605; 313/306; 313/619
[58] Field of Search ............... 313/618, 621, 313/632, 605, 306, 589, 619

[56] References Cited

U.S. PATENT DOCUMENTS

| | | | |
|---|---|---|---|
| 1,841,288 | 1/1932 | Jenks, Jr. | 313/618 |
| 2,800,600 | 7/1957 | Drennan et al. | 313/618 |
| 3,141,989 | 7/1964 | Jones et al. | 313/619 |
| 3,869,643 | 3/1975 | Okagaki | 313/618 |
| 3,909,652 | 9/1975 | Ferre et al. | 313/618 |
| 4,833,366 | 5/1989 | Wu et al. | 313/618 |
| 4,879,493 | 11/1989 | Mastuno et al. | 313/619 |
| 4,885,504 | 12/1989 | Green | 313/618 |
| 4,967,118 | 10/1990 | Urataki et al. | 313/619 |

FOREIGN PATENT DOCUMENTS

| | | | |
|---|---|---|---|
| 1144221 | 4/1983 | Canada | 313/618 |
| 57-40848 | 3/1982 | Japan | 313/618 |
| 1103305 | 7/1984 | U.S.S.R. | 313/618 |
| 1099413 | 1/1968 | United Kingdom | 313/618 |

*Primary Examiner*—Sandra L. O'Shea
*Assistant Examiner*—Matthew J. Esserman

[57] ABSTRACT

A hollow cathode discharge tube is used for atomic absorption analysis. The tube has a cathode which includes a first hollow portion and a second hollow portion connected to each other. The second hollow portion has a diameter greater than the first hollow portion and a close end. Inserted through the closed end is a rod-like anode which has a part within the hollow space of the cathode. There is a auxiliary electrode which can be an auxiliary anode that surrounds the rod-like anode and is insulated therefrom. There is an additional electrode which can be an auxiliary cathode at the front end portion of the cathode. The cathode is formed of a material that is a material or includes a material that is to be analyzed.

7 Claims, 4 Drawing Sheets

FIG. 2(a)
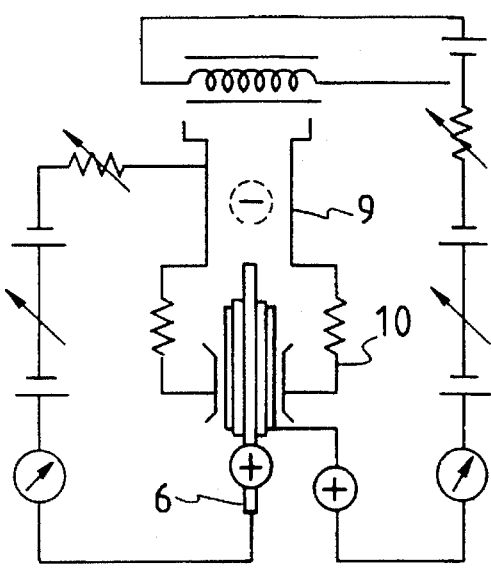
FIG. 2(b)
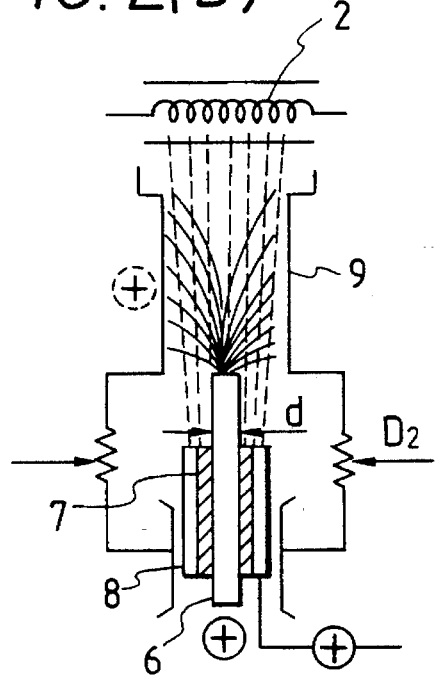
FIG. 2(c)
$$E = \frac{V}{x \cdot \log_e \frac{D(1,2)}{d}} \quad (V/mm)$$
FIG. 2(d)
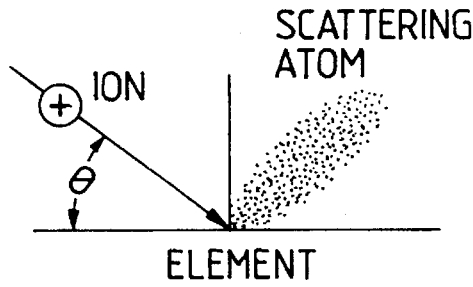
FIG. 2(e)
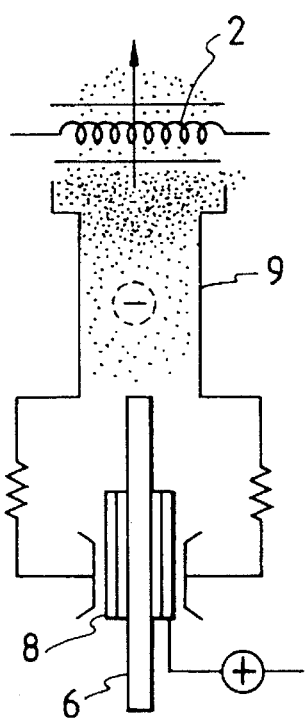

PRIOR ART
FIG. 5(a)
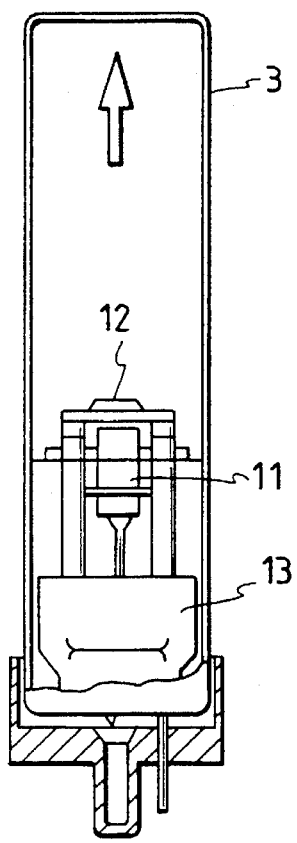
FIG. 5(b)
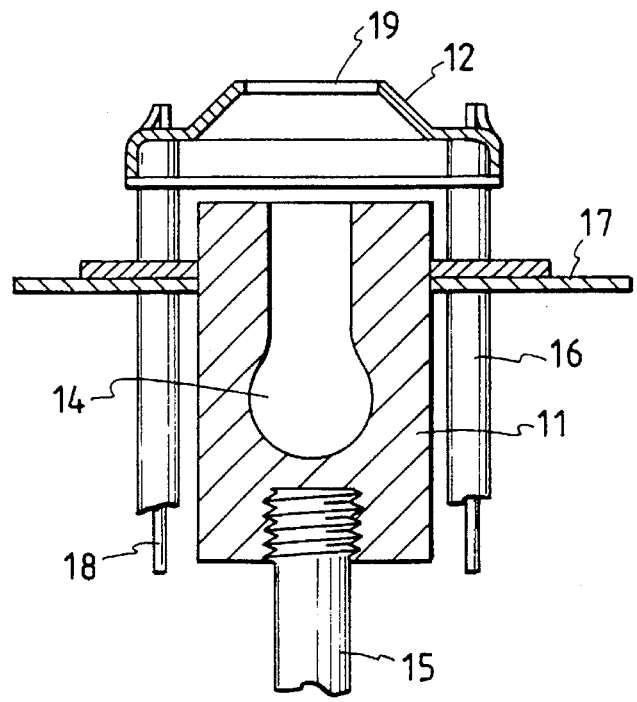
PRIOR ART
FIG. 6(a)   FIG. 6(b)   FIG. 6(c)
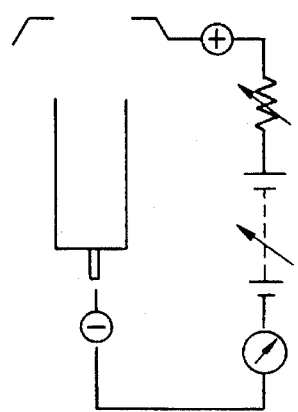 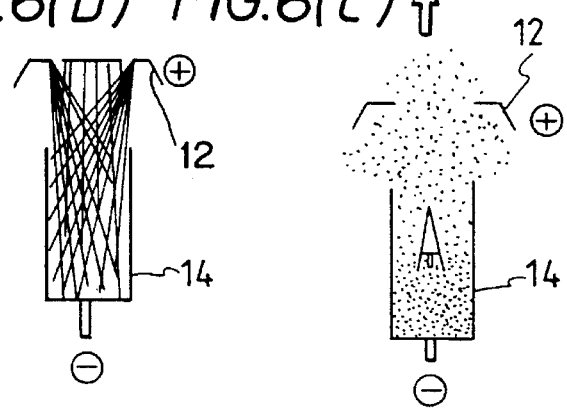

HOLLOW CATHODE DISCHARGE TUBE

FIELD OF THE INVENTION

The present invention relates to a hollow cathode discharge tube for use in atomic absorption analysis that provides improved atomic spectrum characteristics.

DESCRIPTION OF PRIOR ART

In atomic spectrum analysis, the contour of atomic spectrum ray of the analytical element is important in improving the sensitivity of the analysis. To that end, a hollow cathode discharge tube having a low operation temperature is usually utilized in the glow discharge region. The hollow cathode discharge tube comprises, as shown in FIGS. 5(a) and 5(b), a stem 13 having thereon a hollow cathode 11 and an anode 12 arranged in front of the cathode 11 and on the optical axis thereof, with the stem 13 being inserted into a bulb 3 and air-tightly welded together. The detailed construction of the cathode 11 and the anode 12 is shown in FIG. 5(b). The cathode 11 is usually formed of a material which is the same material as the analytical element, but other materials may be mixed for machinability or the for strength of the atomic spectrum ray. The hollow cathode 11 has an opening 14 arranged on the optical axis and, is connected to a hollow cathode conductor 15 and is retained thereby. The anode 12 is electrically separated from the hollow cathode 11 and from the hollow cathode conductor 15 through an insulating porcelain element 16 or an insulator element 17 such as mica and the like and, is retained by anode lead-in wires 18 in front of and opposing the hollow cathode 11. Further, there is formed an opening 19 along the optical axis so as to pass through the atomic spectrum ray generated by the electric discharge. The hollow cathode discharge tube being formed as described above is processed under a predetermined treatment and, thereafter, gas such as neon or argon is charged under the pressure of several hundred Pa.

The hollow cathode discharge tube for use in atomic absorption analysis requires the atomic spectrum ray of the analytical element itself. This utilizes a phenomenon that when atomic conditions of the analytical element exist in the discharge space according to the electric discharge the atomic spectrum ray is generated by giving and receiving the electric energy. For generating the atomic condition of the analytical element in the discharge space, electric ions are collided against the surface of the cathode by electric discharge phenomenon so as to scatter the atoms of the cathode element. This phenomenon is called sputtering. It is also possible to obtain the atomic element due to the evaporation from the inside of the cathode by applying Joule heat. FIG. 6(a) shows the electric relationship of the hollow cathode discharge tube and, as shown in FIG. 6(b), the electric field in the discharge space of the discharge tube is an unequal electric field condition. While, according to the sputtering condition on the surface of the cathode the atoms scatter in a direction opposed to the direction of the injection of the ions due to the electric discharge, as shown in FIG. 2(d) the amount thereof varies according to the element, but depends on the angle of injection of the ion such that the maximum distribution appears in the range of 0 to 60 degrees of the injection angle. When the injection angle is 90 degrees, the atoms do not scatter and charges into the cathode element, thereby the energy of the atoms is converted into heat. The evaporation caused by Joule heat generated by the charging of the ions is, as publicly known, distributed in the cosine direction on the surface of the cathode. The condition of scattering atom of the cathode element during the hollow cathode discharge takes the condition shown in FIG. 6(c) and, the density is large at the bottom portion of the opening 14. Accordingly, the spectrum ray generates at the bottom portion of the opening 14 and moves toward the anode 12. A part of the spectrum ray affords the energy to the scattered atom element, thereby the intensity of the spectrum ray decreases gradually and, it is deemed that the atomic absorption analysis is carried out within the hollow cathode discharge tube. This phenomenon is called self absorption. When the spectrum ray is in the above described condition, the intensity decreases and the contour of the spectrum ray is damaged, thus, the sensitivity of the absorption analysis is decreased.

The contour of the atomic spectrum ray affecting the sensitivity of the absorption analysis as described above is not a simple geometrical line and has an intensity distribution along a range of frequencies. The above described intensity distribution is called broadening of the atomic spectrum and, the cause of which are as follows. In particular, (1) natural or inherent broadening due to the fact that the life of the excited condition is limited; (2) Doppler broadening due to the motion of atoms and molecules constituting the gas; (3) Lorentz broadening due to the collision of atoms and molecules of the co-existing gas; (4) Holzmark broadening due to the collision of atoms and molecules of the gas with each other; and (5) Stark broadening due to the collision of electrons or ions. The contour of the atomic spectrum is affected by these factors and, the contour determines the absorption factor as the characteristics of the spectrum ray in the atomic absorption analysis. Usually, the contour of the spectrum ray is determined by two or three factors of the above mentioned five factors. Usually, the center of of the contour of the spectrum ray coincides with the center of the absorption frequency and, in this meaning, it is symmetrical. But when the contour is determined only by Doppler broadening, the center of the contour of the spectrum ray does not coincide with the center of the absorption frequency and the contour of the spectrum ray is not symmetrical. The contour has a complex configuration and the value of the coefficient of absorption becomes the largest. In this case, it is possible to obtain the coefficient of absorption from the equation given by Voigt, thus, the contour is called Voigt's contour. Therefore, for reducing the Doppler width, in the atomic absorption analysis, the hollow cathode discharge tube is utilized which operates with a cold cathode with the temperature of which being low. However, the strength of the spectrum ray generating from the hollow cathode discharge tube also decreases and the contour is broadened. The spectrum ray generates from the transition between the energy levels due to the transfer of energy between the electron and the element atom in discharge space.

The atomic spectrum ray used in the hollow cathode discharge tube is originated at a portion adjacent to the wall surface of the cathode. This is usually called glow discharge. Since the density of the ion is thick in such portion, and the secondary electron is generated only by the ion impacting against the surface of the cathode, the number of scattering atoms of the element is larger than the number of the ions having the energy, thereby the self absorption increases. An object of the present invention is to cover the above described shortage of the electron by supplying electrons from an additional source.

The energy of the spectrum ray generating from the atom of the exciting element is decreased by the absorption when the ray passes through the element atom in the base bottom condition and, as the result, the intensity of the spectrum ray radiated from the discharge space is decreased, the contour of the spectrum ray is broadened, and the sensitivity of the absorption analysis is decreased. Such phenomenon will fully be understood from the following detailed description in conjunction with the comparison data relative to the embodiment of the present invention.

As heretofore described, when the atomic spectrum ray radiated from the hollow cathode discharge tube passes through the element atom in the base bottom condition, the intensity of the spectrum ray is decreased, the contour of the spectrum ray is broadened, and the characteristics such as the sensitivity of the absorption analysis will also be deteriorated.

An object of the present invention is to eliminate the self-absorption phenomenon in the hollow cathode discharge tube, and to obtain a high brightness hollow cathode discharge tube having increased intensity of the atomic spectrum ray.

SUMMARY OF THE INVENTION

According to the invention, there is provided a hollow cathode discharge tube of the type having a hollow cathode and an anode together with a thermion emitting anode/cathode located a bulb. The hollow cathode is formed of the same materials as the analytical element or a complex material thereof and has a hollow space consisting of two mutually connected portions, one small diameter open portion and a second large diameter closed portion, with the closed end of the hollow space of the hollow cathode being pierced by a rod-like anode, the thermion emitting anode or an anode commonly acting as the rod-like anode and the thermion emitting anode with the electric insulating material interposing therebetween, with the rod-like anode, the thermion emitting anode or the anode commonly acting as the rod-like anode and the thermion emitting anode being mounted within the hollow space of the cathode.

According to a preferred embodiment, an auxiliary electrode is provided in front of the open end of the hollow cathode for emitting thermions. The rod like anode and the thermion emitting auxiliary electrode are respectively arranged co-axially with the axis of the hollow cathode through insulating material, thus, it is possible to convert forcively the element atom of the base or bottom condition which causes the self absorption phenomenon into the element atom of the excited condition by the distinct auxiliary electrode effecting the thermion emission. The discharging current for the electric discharge of the auxiliary electrode is controlled such that the location of the anode is determined for effectively increasing and utilizing the discharge electric current of the auxiliary electrode. The location of the anode is determined such that the amount of scattering element atoms of the hollow cathode is effectively increased and utilized and, further, the distribution of the scattering element atoms is determined such that the collision phenomenon of the atoms in an unequal electric field is suitably performed.

BRIEF DESCRIPTION OF THE DRAWINGS

The invention will now be explained in detail with reference to attached drawings, wherein:

FIG. 2(a) is a view showing the electric connection of the hollow cathode discharge tube of FIG. 1(a);

FIG. 2(b) is a view showing inequal electric field in the hollow cathode discharge tube of FIG. 1(a);

FIG. 2(c) is an experimental equation relative to the electric field between a rod electrode and a hollow electrode;

FIG. 2(d) is a view showing scattering direction of element atoms;

FIG. 2(e) is a view showing the distribution of the scattering element atoms;

FIG. 5(a) illustrates a prior art type of hollow cathode discharge tube;

FIG. 5(b) is a view showing a section of electrode in the prior art hollow cathode discharge tube of FIG. 5(A);

FIG. 6(a) shows the electric connection of the prior art hollow cathode discharge tube of FIG. 5(a);

FIG. 6(b) is a view showing an unequal electric field, and

FIG. 6(c) is a view showing the distribution of scattering element atom in the prior art hollow cathode discharge tube of FIG. 5(a).

BRIEF DESCRIPTION OF PREFERRED EMBODIMENTS

Figure 1A:
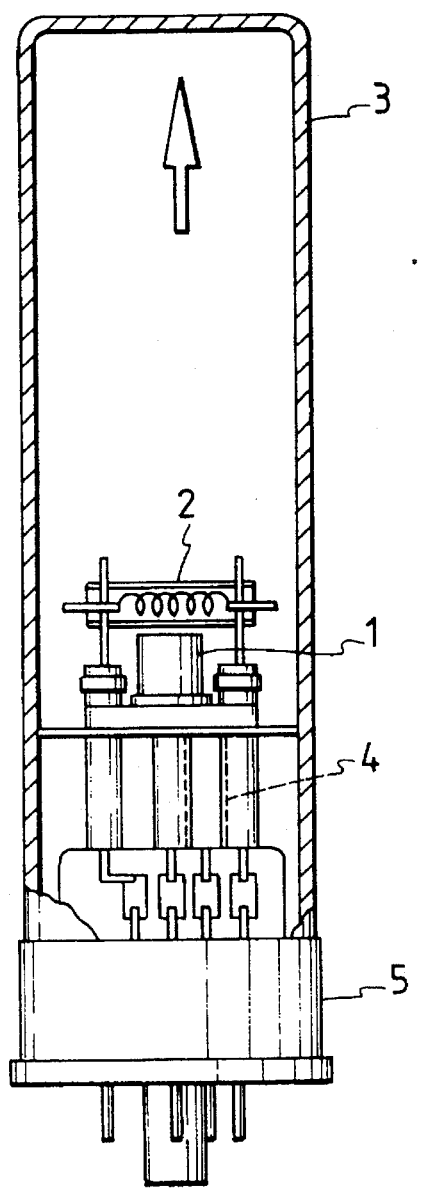
FIG. 1(a) is a schematic partially broken side view of a hollow cathode discharge tube according to an embodiment of the present invention.
Figure 1B:
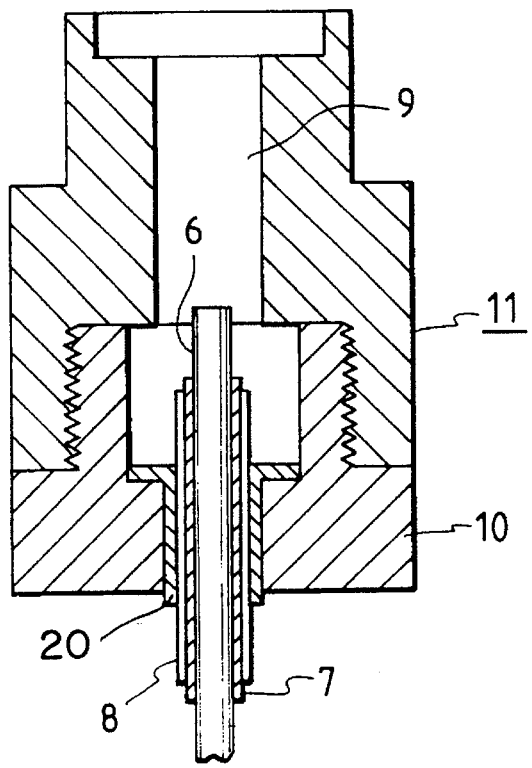
FIG. 1(b) is an enlarged sectional view of hollow cathode portion of the hollow cathode discharge tube of FIG. 1(a)

A preferred embodiment of the present invention will now be explained with reference to the drawings, in which, as shown in FIG. 1(a), a bulb 3 formed of Silica glass enclosed therein Argon gas or Neon gas under the pressure of several hundred Pa and having an anode/cathode portion 1, a thermion emitting auxiliary electrode which is a cathode 2 opposing the anode/cathode portion 1, and a socket 5 retaining the bulb 3 and remedying the optical axis of the spectrum ray generated from the inside of the bulb 3. Shown at numeral 4 in the drawing are insulating tubes covering respective lead-in wires. The anode/cathode portion 1 is formed of a hollow cathode 11 defining therein a space consisting of two generally cylindrical and mutually connected spaces of different diameters, a rod-like anode 6 and a thermion emitting auxiliary electrode which is an anode 8 encircling the rod-like anode 6 interposing therebetween insulators 7 and 20, with the anode 6 and the auxiliary anode 8 being arranged co-axial with the hollow cathode 11. The hollow cathode 11 is formed of a front hollow cathode portion 9 having a small diameter space and a rear hollow cathode portion 10 having a large diameter space and being tightly connected to the front hollow cathode portion 9. The front end of the front hollow cathode 9 is formed to have an opening which opposes the thermion emitting auxiliary cathode (booster) 2 being disposed in front of the hollow cathode 11 and on the optical axis thereof. The rear end of the rear hollow cathode 10 is closed and, through which the rod-like anode 6 and the thermion emitting auxiliary anode 8 pass air-tightly interposing therebetween the insulating tubes, element 7 and element 20. There arises the thermion discharge phenomenon between the auxiliary anode 8 and the thermion emitting auxiliary cathode 2 which is disposed outside of the bundle of atomic spectrum ray discharging within the hollow space of the hollow cathode 11.

The operational function of the hollow cathode discharge tube according to the present invention in generating the atomic spectrum ray will now be explained. As shown in the electrical connection diagram of FIG. 2(a), one end of the hollow cathode 11, which is formed of the front hollow cathode 9 having a small diameter space and being connected to the rear hollow cathode 10 having a large diameter space, is connected through a resistance to a minus potential of an electric source. And the rod-like anode 6 passing through the other end of the hollow cathode 11 is connected to the plus potential of the electric source. Thereby, the electric field in the electric discharge space in the hollow cathode 11 is an unequal electric field as shown in solid lines in FIG. 2(b) which mainly is observed in the front hollow cathode 9. When calculated by utilizing an experimental equation of the electric field between a rod like electrode and a hollow electrode shown in FIG. 2(c), it will be understood that the electric field in the rear hollow electrode is substantially small. The surface of the front hollow cathode portion 9 being formed of element atoms is attacked by ions due to the glow discharge, and the amount of scattering element atoms is determined by the spattering rate of the element atoms and the angle of incidence of the ions. The directions of the scattering element atoms are shown in FIG. 2(d). Accordingly, as shown in FIG. 2(e), the density of the scattering element atoms in the discharge space of the hollow cathode 11 is thick in the tip end portion of the cathode 11, and thin in the hollow space of the front cathode 9 in which space the density of the electric field is thick. Accordingly, the density of the electric field is thin in the glow discharge portion of the hollow cathode 11, or in the tip end portion of the hollow cathode 11 and, the effect of the exciting phenomenon is small. In other words, the amount of unexcited scattering atom is large in the tip end portion of the hollow cathode. Further, in the glow discharge portion of the hollow cathode 11, the amount of the secondary atoms emitted from the cathode surface of the hollow cathode 11 is smaller than the case of thermion discharge utilizing the thermion emitting auxiliary scattering cathode. Thus, according to the invention, the unexcited scattering atom of the electrode element are generated on the path of electric discharge which is co-axial with the optical axis of the hollow electrode 11, so that the thermion discharge is performed, as shown by broken lines in FIG. 2(b), in the unequal electric field shown by solid lines in the drawing, therby converting the unexcited scattering atoms of the electrode element into excited condition.

Figure 3A:
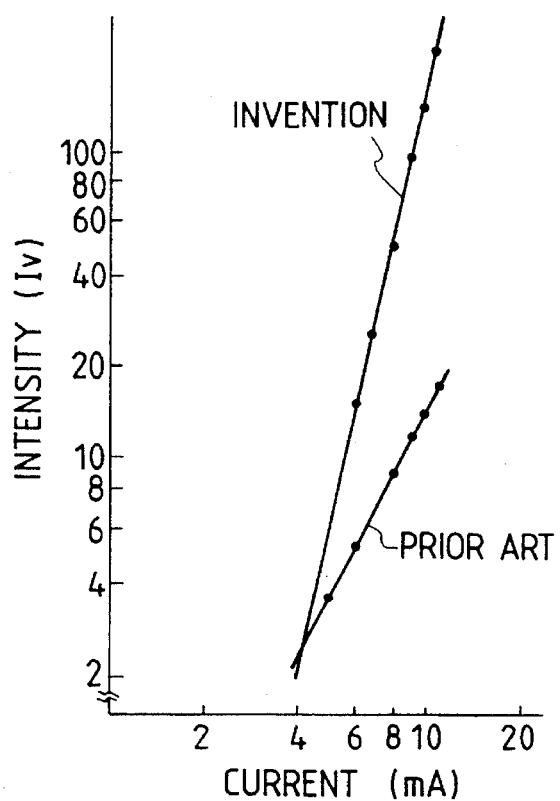
FIG. 3(a) is a diagram of the intensity of the spectrum ray in the embodiment of FIG. 1(a)
Figure 3B:
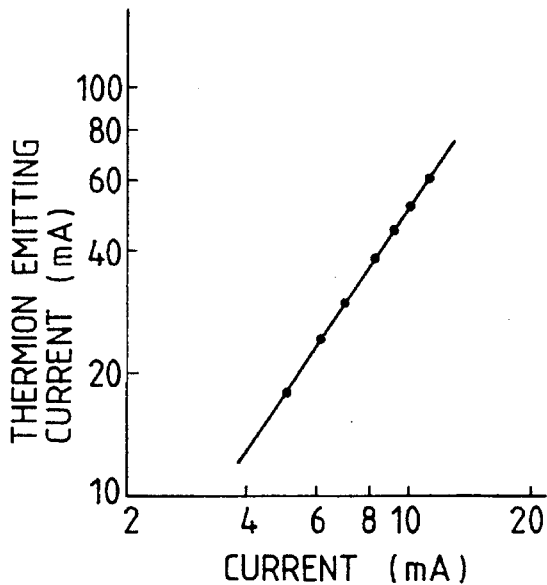
FIG. 3(b) is a diagram showing the relationship between the electric current in the discharge tube and the thermion emitting electric current when the intensity of the spectrum ray is at the maximum.
Figure 4:
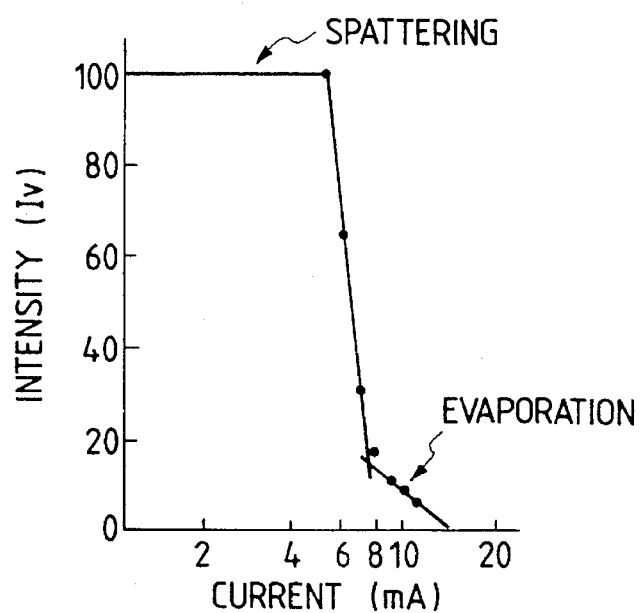
FIG. 4 is a diagram showing the relationship of the effective intensity (Iv) and tube current.

Further, FIG. 3(a) shows the intensity of the spectrum ray according to the present invention which utilizes Arsenic as the material of the cathode electrode as compared with that of usual material of a hollow cathode discharge tubes. When the intensity of the electric current is 10 mA, the intensity of the spectrum ray according to the invention is increased by about 10.7 times of that of prior art. The electric current for discharging thermions is, as shown in FIG. 3(b) showing the relationship between the electric current of the hollow cathode discharge tube and the thermion discharging electric current when the intensity of the spectrum ray, at the maximum 53 mA, and which electric current is required in converting inexcited element atom corresponding the amount of self-absorption into the excited element atom. FIG. 4 shows the relationship between the effective intensity (Iv) of spectrum ray and the tube electric current. From the drawing, it will be understood that the intensity of the spectrum ray decreases steeply when the tube electric current is 5 mA, which shows that the absorption occurs when the atomic spectrum ray passes between the inexcited element atom in the discharge space of the hollow electrode.

Two characteristics, namely, the intensity of the spectrum ray and the sensitiveness of the analysis effected by the absorption were examined with respect to various elements, and the result is that the intensity of the spectrum ray increases with respect to all of the elements and the sensitiveness of the analysis is remarkably improved with respect to elements having low melting point and high vapor pressure, but, in the case of the elements having high melting point, the sensitiveness is low and is maintained at a nearly constant value even though electric current of the tube is increased.

In the above described embodiment, the space formed in the hollow cathode is a space formed of two generally cylindrical spaces having different inner diameters and being connected with each other, but these spaces should not necessarily be cylindrical, and it is required that the diametrical size of the front space should be smaller than that of the rear space.

As described heretofore, the hollow cathode discharge tube according to the invention is of the type having a thermion emitting anode/cathode together with an anode and a hollow cathode in a bulb and, the hollow cathode is formed of an analytical element or the complex material thereof and has therein a hollow space consisting of mutually connected small diameter one end open portion and a large diameter one end closed portion, with the rod-like anode, the thermion emitting anode or the anode commonly acting as the rod-like anode and the thermion emitting anode being disposed in the hollow space of the hollow cathode and piercing through the closed end of the hollow space of the hollow cathode interposing therebetween electric insulating material; thereby, it is possible to achieve a hollow cathode discharge tube excluding the self-absorption phenomenon in the hollow cathode discharge tube, narrowing the contour of the spectrum ray, increasing the intensity of the atomic spectrum ray and obtaining higher brightness as compared to prior art hollow cathode discharge tubes.

Further, according to a preferred embodiment, the hollow cathode discharge tube comprises a hollow cathode. The hollow cathode includes two connecting portion forming a hollow space. One portion is of a small diameter with an open end. A second portion is of a larger diameter with a closed end. A rod-like anode is inserted through the closed end and is surrounded by an auxiliary anode for emitting thermions and separated therefrom by electrical insulation. A thermion emitting cathode is located in front of the open end of the hollow cathode, whereby it is possible to convert forcively the element atoms of the base or bottom condition which causes the self absorption phenomenon into the element atoms of the excited condition by the distinct auxiliary anode effecting the thermion emission. Further, the discharging current for the electric discharge of the auxiliary anode is controlled such that the location of the rod-like anode is determined for effectively increasing and utilizing the discharge electric current of the auxiliary and accordingly it is possible to effectively control the scattering element atoms in the hollow cathode.

What is claimed is:

1. A hollow cathode discharge tube of the type having a thermion emitting electrode in combination with a hollow cathode and an anode in a bulb comprising:

a hollow spaced cathode having a first hollow spaced small diameter portion, a second hollow spaced large diameter portion the first and second portions connected together with the first portion having an open end portion and the second portion having a closed end portion;

an anode extending through said closed end portion;

an insulator surrounding a part of said anode; and a first auxiliary electrode for emitting thermions insulated from said cathode and anode and extending into the hollow space of the cathode.

2. A hollow cathode discharge tube as claimed in claim 1, wherein there is a second auxiliary electrode provided in front of the open end portion of the hollow cathode for emitting thermions.

3. A hollow cathode discharge tube as described in claim 1, wherein said first anode and said first auxiliary electrode are arranged co-axially with the hollow cathode.

4. A hollow cathode discharge tube as described in claim 1, wherein said first auxiliary electrode is an auxiliary anode.

5. A hollow cathode discharge tube as described in claim 2, wherein said second electrode for emitting thermions is an auxiliary cathode.

6. A hollow cathode discharge tube as described in claim 1, wherein said hollow cathode is formed of a material for analyzing.

7. A hollow cathode discharge tube as described in claim 1, wherein said hollow cathode is formed of a compound material a portion of which is for analyzing.

* * * * *